(12) United States Patent
Shafer

(10) Patent No.: US 6,568,430 B1
(45) Date of Patent: May 27, 2003

(54) QUICK RELEASE PIPE END CAP

(76) Inventor: William R. Shafer, 1220 Oakwood Ave., Daytona Beach, FL (US) 32114

( * ) Notice: Subject to any disclaimer, the term of this patent is extended or adjusted under 35 U.S.C. 154(b) by 0 days.

(21) Appl. No.: 10/215,277

(22) Filed: Aug. 7, 2002

(51) Int. Cl.[7] .............. F16L 57/00; B65D 59/00
(52) U.S. Cl. ................. 138/96 R; 138/89; 285/901
(58) Field of Search .............. 138/89, 89.1, 96 T, 138/96 R; 285/236, 901; 292/256

(56) References Cited

U.S. PATENT DOCUMENTS

| | | | | |
|---|---|---|---|---|
| 3,713,463 A | * | 1/1973 | Bywater, Jr. ............. | 138/89 |
| 4,349,048 A | * | 9/1982 | Clark ................... | 138/96 T |
| 4,616,679 A | * | 10/1986 | Benton ................. | 138/96 T |
| 5,368,074 A | * | 11/1994 | Hall .................... | 138/96 T |
| 5,524,672 A | * | 6/1996 | Mosing et al. ........... | 138/96 T |
| D379,851 S | * | 6/1997 | Mathison ............... | D23/260 |
| 5,758,693 A | * | 6/1998 | Caine ................... | 138/89 |
| 5,819,805 A | * | 10/1998 | Mosing et al. ........... | 138/96 T |
| 5,850,854 A | * | 12/1998 | Carroll ................. | 138/96 R |
| 5,915,418 A | * | 6/1999 | Turner .................. | 138/89 |
| 5,915,899 A | * | 6/1999 | Dennis .................. | 410/36 |
| 5,967,190 A | * | 10/1999 | Korpi et al. ............ | 138/96 R |
| 6,332,478 B1 | * | 12/2001 | Holden et al. ........... | 138/96 R |

* cited by examiner

*Primary Examiner*—Patrick Brinson

(57) ABSTRACT

Quick release pipe end caps secure materials enclosed by pipes. This is accomplished by capping the ends of the storage pipe with quick release pipe end caps. Contractors frequently transport a variety of materials to job sites using a large pipe as a storage container. Quick release pipe end caps have a cap which covers the end of a pipe and a quick release mechanism which removably secures the cap to the pipe without requiring the use of tools. The quick release mechanism consists of a band having slots which is enclosed by a latching mechanism. The cams on the end of a locking lever engage with the slots in the band and tighten the band about the cap.

7 Claims, 4 Drawing Sheets

QUICK RELEASE PIPE END CAP

BACKGROUND OF THE INVENTION

1. Field of the Invention

The present invention relates to a quick release pipe end cap for use in connection with pipes. The quick release pipe end cap has particular utility in connection with securing materials enclosed by pipes.

2. Description of the Prior Art

Quick release pipe end caps are desirable for securing materials enclosed by pipes. This is accomplished by capping the ends of the storage pipe with quick release pipe end caps. Contractors frequently transport a variety of materials to job sites using a large pipe as a storage container. In particular, multiple sizes of pipes may be nested inside of one another to minimize the space they occupy. Duct tape is frequently used to secure the ends of the pipe, but this is potentially ineffective as well as messy and time-consuming. Quick release pipe end caps have the additional advantage of easily being removably secured to pipes without the use of tools.

The use of closure members for pipes and the like is known in the prior art. For example, U.S. Pat. No. 3,713,463 to Bywater, Jr. discloses a closure member for pipes and the like. However, the Bywater, Jr. '463 patent does not have a locking lever, and has further drawbacks of requiring tools to operate the latching mechanism.

U.S. Pat. No. 2,526,238 to Kendall discloses a pipeline closure that temporarily closes the open end of a pipeline. However, the Kendall '238 patent does not have a locking lever, and additionally does not have a band with overlapping opposing ends.

Similarly, U.S. Pat. No. 5,337,792 to Tempel discloses a protective cover for pipe end that prevents the ingress of snow and rain into the interior of a pipe. However, the Tempel '792 patent does not have a locking lever, and also lacks a band encircling the exterior of the pipe.

In addition, U.S. Pat. No. 4,205,707 to Lundgren discloses a pipe protector that covers a pipe end. However, the Lundgren '707 patent does not have a locking lever, and also requires the use of tools to align the teeth.

Furthermore, U.S. Pat. No. 5,074,336 to Black discloses a lightweight pipe clip for maintaining an end plug insertably coupled to an irrigation pipe outlet. However, the Black '336 patent does not have a locking lever, and further lacks a band encircling the exterior of the pipe.

Lastly, U.S. Pat. No. Des. 257,057 to Logsdon discloses a pipe test cap. However, the Logsdon '057 patent does not have a locking lever, and has the additional deficiency of lacking a band encircling the exterior of the pipe.

While the above-described devices fulfill their respective, particular objectives and requirements, the aforementioned patents do not describe a quick release pipe end cap that allows securing materials enclosed by pipes. The Bywater, Jr. '463 patent, the Kendall '238 patent, the Tempel '792 patent, the Lundgren '707 patent, the Black '336 patent, and the Logsdon '057 patent make no provision for a locking lever. The Bywater, Jr. '463 patent and the Lundgren '707 patent require tools to secure themselves to the pipe. The Kendall '238 patent does not have a band with overlapping opposing ends. The Tempel '792 patent, the Black '336 patent, and the Logsdon '057 patent lack a band encircling the exterior of the pipe.

Therefore, a need exists for a new and improved quick release pipe end cap that can be used for securing materials enclosed by pipes. In this regard, the present invention substantially fulfills this need. In this respect, the quick release pipe end cap according to the present invention substantially departs from the conventional concepts and designs of the prior art, and in doing so provides an apparatus primarily developed for the purpose of securing materials enclosed by pipes.

SUMMARY OF THE INVENTION

In view of the foregoing disadvantages inherent in the known types of closure members for pipes and the like now present in the prior art, the present invention provides an improved quick release pipe end cap, and overcomes the above-mentioned disadvantages and drawbacks of the prior art. As such, the general purpose of the present invention, which will be described subsequently in greater detail, is to provide a new and improved quick release pipe end cap which has all the advantages of the prior art mentioned heretofore and many novel features that result in a quick release pipe end cap which is not anticipated, rendered obvious, suggested, or even implied by the prior art, either alone or in any combination thereof.

To attain this, the present invention essentially comprises a cap with a closed end, an open end, and a quick release mechanism attached to it sidewall.

There has thus been outlined, rather broadly, the more important features of the invention in order that the detailed description thereof that follows may be better understood and in order that the present contribution to the art may be better appreciated.

The invention may also include the cap being cylindrical in shape and made of an elastomeric material such as neoprene rubber. The quick release mechanism may take the form of a band having slots cut into its top surface encircling the cap. The opposing ends of the band may overlap within a hollow band enclosure in such a manner that the slots are on top. A cam slot may be cut in the top of the band enclosure. Pin supports may be attached to the top of the band enclosure. A locking lever may be rotatably mounted on a pin inserted through the pin supports. The locking lever may be arcuate in shape, and may have cams attached to the end mounted on the pin such that the cams engage with the slots on the band when the locking lever is rotated in a clockwise direction. The quick release mechanism components may be made of stainless steel. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved quick release pipe end cap that has all of the advantages of the prior art closure members for pipes and the like and none of the disadvantages.

It is another object of the present invention to provide a new and improved quick release pipe end cap that may be easily and efficiently manufactured and marketed.

An even further object of the present invention is to provide a new and improved quick release pipe end cap that has a low cost of manufacture with regard to both materials and labor, and which accordingly is then susceptible of low prices of sale to the consuming public, thereby making such quick release pipe end cap economically available to the buying public.

Still another object of the present invention is to provide a new quick release pipe end cap that provides in the apparatuses and methods of the prior art some of the advantages thereof, while simultaneously overcoming some of the disadvantages normally associated therewith.

Even still another object of the present invention is to provide a quick release pipe end cap for securing materials enclosed by pipes. This allows the user to quickly attach the quick release pipe end cap to a pipe without the use of tools.

Still yet another object of the present invention is to provide a quick release pipe end cap for securing materials enclosed by pipes. This makes it possible to easily remove the quick release pipe end cap from a pipe without the use of tools.

An additional object of the present invention is to provide a quick release pipe end cap for securing materials enclosed by pipes. This ensures that the quick release pipe end cap will remain in place while the pipe is transported.

Lastly, it is an object of the present invention to provide a new and improved quick release pipe end cap for securing materials enclosed by pipes.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
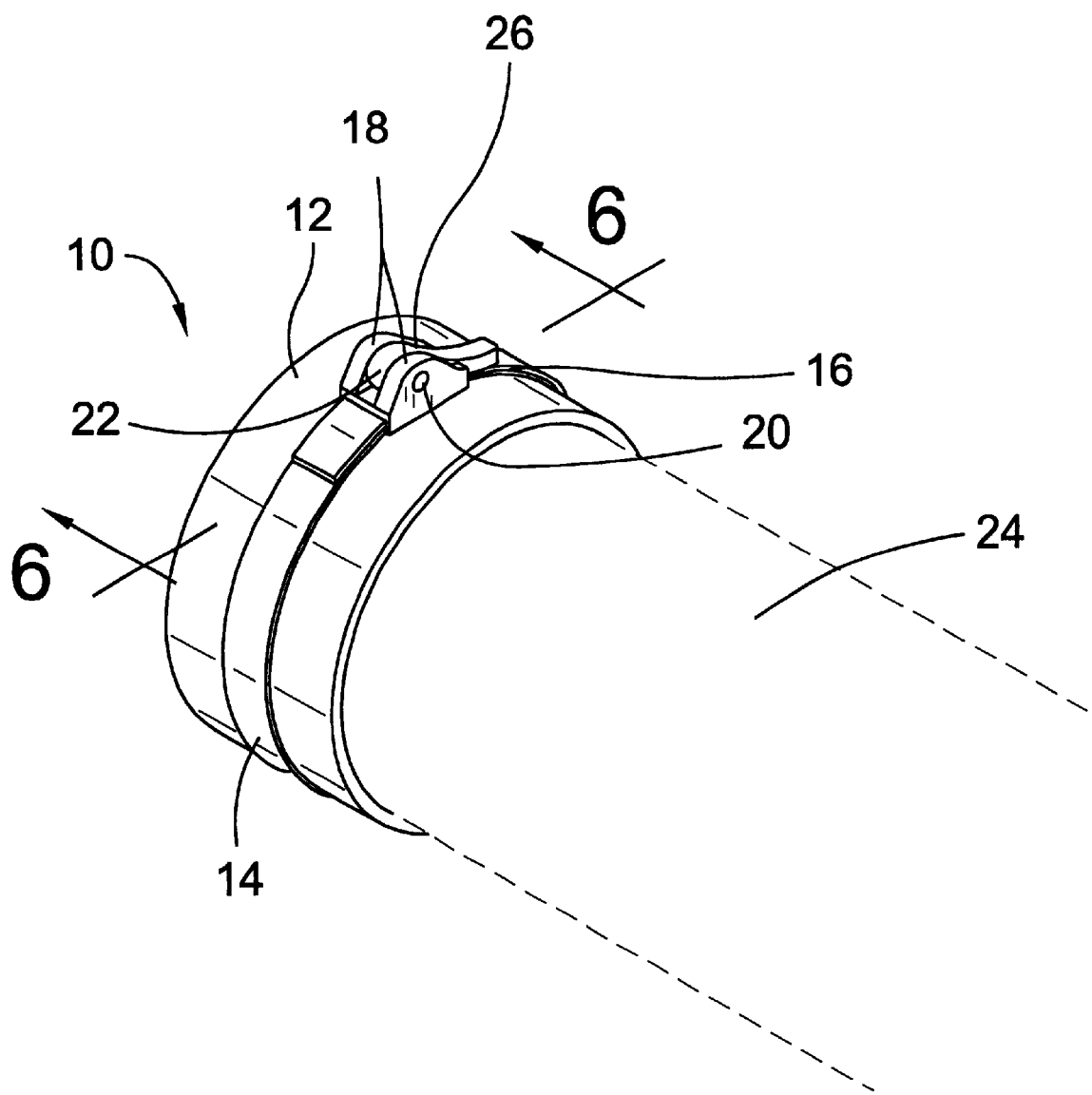
FIG. 1 is a top perspective view of the current embodiment of the quick release pipe end cap constructed in accordance with the principles of the present invention.

Referring now to the drawings, and particularly to FIGS. 1–6, a current embodiment of the quick release pipe end cap of the present invention is shown and generally designated by the reference numeral 10.

In FIG. 1, a new and improved quick release pipe end cap 10 of the present invention for securing materials enclosed by pipes is illustrated and will be described. More particularly, the quick release pipe end cap 10 has a cap 12 covering the end of pipe 24. In the current embodiment, cap 12 is cylindrical in shape, has an open end and a closed end, and is made of neoprene rubber. Encircling cap 12 is band 14 made of stainless steel in the current embodiment. The opposing ends of band 14 are inserted through hollow band enclosure 16 of latching mechanism 26. In the current embodiment, all of the components of latching mechanism 26 are made of stainless steel. The band enclosure 16 is rectangular in shape and has pin supports 18 connected to the top of band enclosure 16. Locking lever 22 is rotatably mounted on pin 20 that is inserted through pin supports 18. Locking lever 22 is arcuate in shape in the current embodiment. Latching mechanism 26 is shown in its closed position. Note that the broken lines illustrating pipe 24 are for illustrative purposes only and are not part of the present invention.

Figure 2:
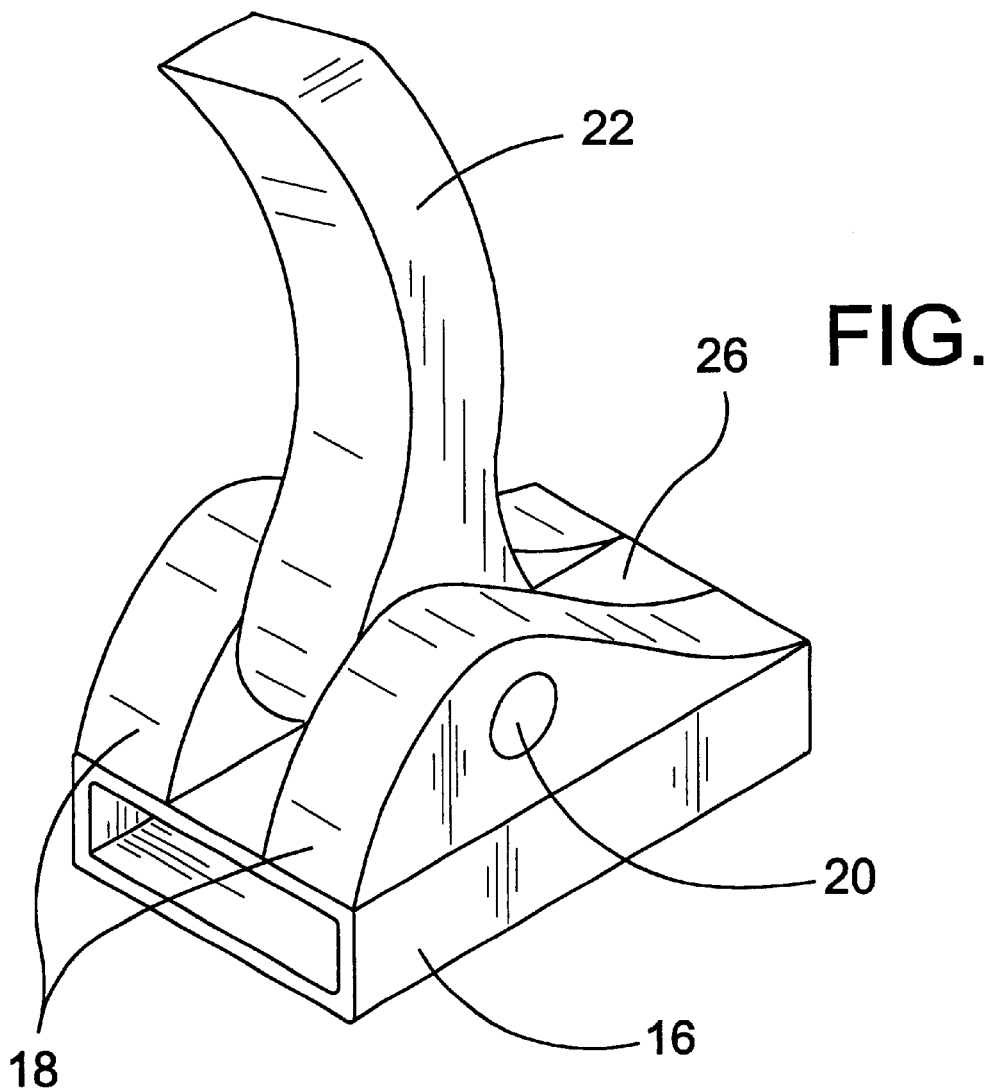
FIG. 2 is a top perspective view of the latching mechanism of the present invention.

Moving on to FIG. 2, a new and improved latching mechanism 26 of the present invention for securing materials enclosed by pipes is illustrated and will be described. More particularly, the latching mechanism 26 has a hollow band enclosure 16 with pin supports 18 attached to the top of band enclosure 16. Locking lever 22 is rotatably mounted on pin 20. Pin 20 is in turn supported by pin supports 18. The latching mechanism 26 is shown in its open position.

Figure 3:
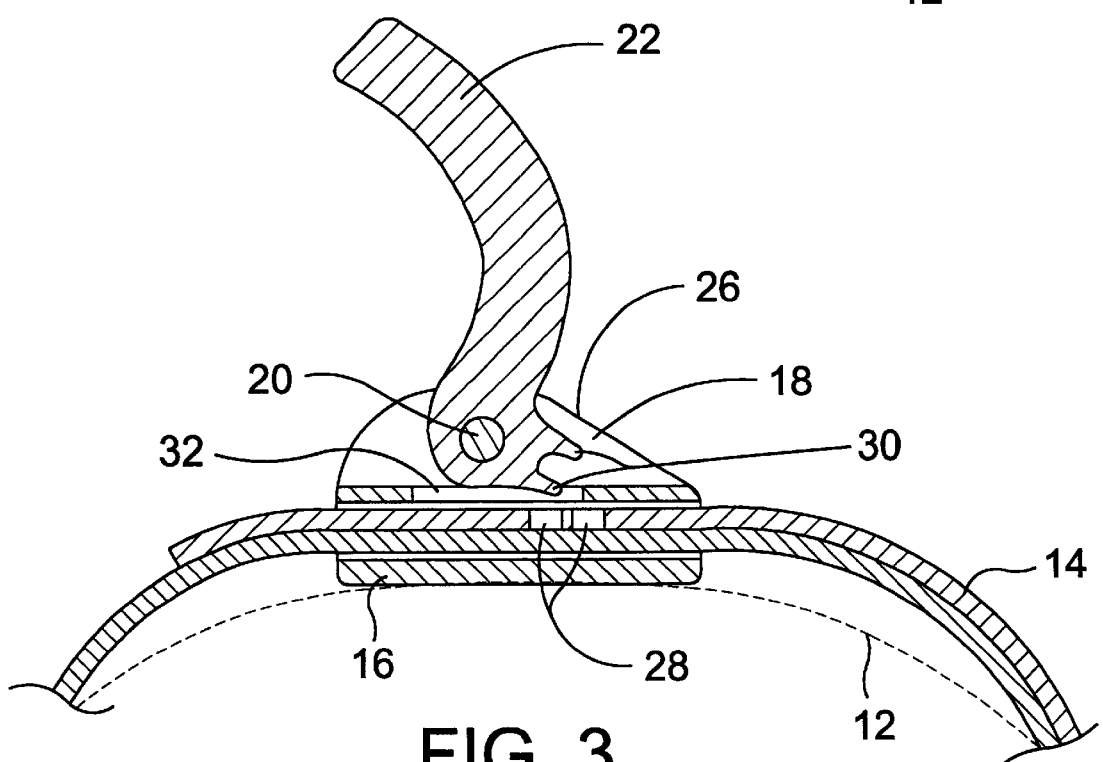
FIG. 3 is a side sectional view of the latching mechanism of the present invention.

Containing with FIG. 3, a new and improved latching mechanism 26 of the present invention for securing materials enclosed by pipes is illustrated and will be described. More particularly, the opposing ends of band 14 are inserted through band enclosure 16 so that the slots 28 cut in the top of band 14 are on top. The top of band enclosure 16 has a cam slot 32 so that cams 30 on the end of locking lever 22 can engage with slots 28 when locking lever 22 is rotated in a clockwise direction. Locking lever 22 is mounted on a pin 20 that is secured by pin support 18. Band 14 is shown encircling cap 12. Latching mechanism 26 is shown in its open position.

Figure 4:
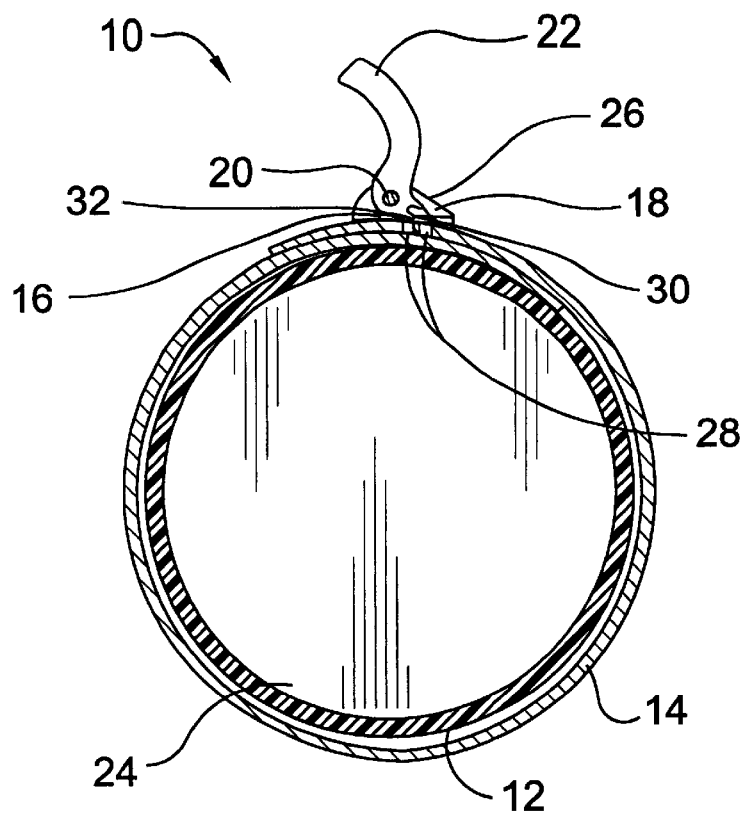
FIG. 4 is a side sectional view of the quick release pipe end cap of the present invention.

In FIG. 4, a new and improved quick release pipe end cap 10 of the present invention for securing materials enclosed by pipes is illustrated and will be described. More particularly, the quick release pipe end cap 10 has a cap 12 covering one end of pipe 24. Band 14 encircles cap 12 and is secured by latching mechanism 26. Latching mechanism 26 is shown in its open position, with cams 30 disengaged from slots 28. Locking lever 22 is rotatably mounted on pin 20. Pin support 18 holds pin 20 in place. Cam slot 32 and the top of band enclosure 16 is also visible. Note that pipe 24 is for illustrative purposes only and is not part of the current invention.

Figure 5:
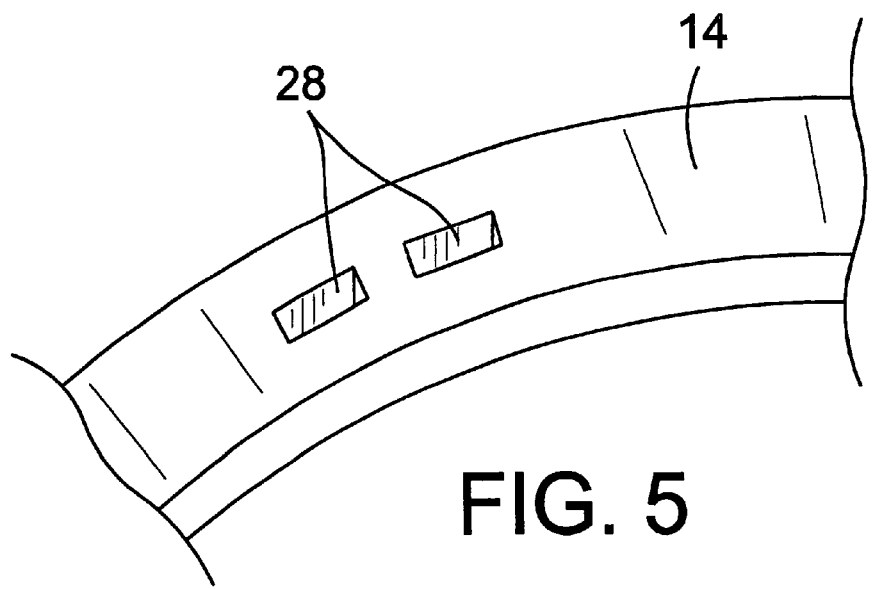
FIG. 5 is a top perspective view of the band of the present invention.

Furthermore, in FIG. 5, a new and improved band 14 of the present invention for securing materials enclosed by pipes is illustrated and will be described. More particularly, the band 14 has slots 28 cut in its top surface.

Figure 6:
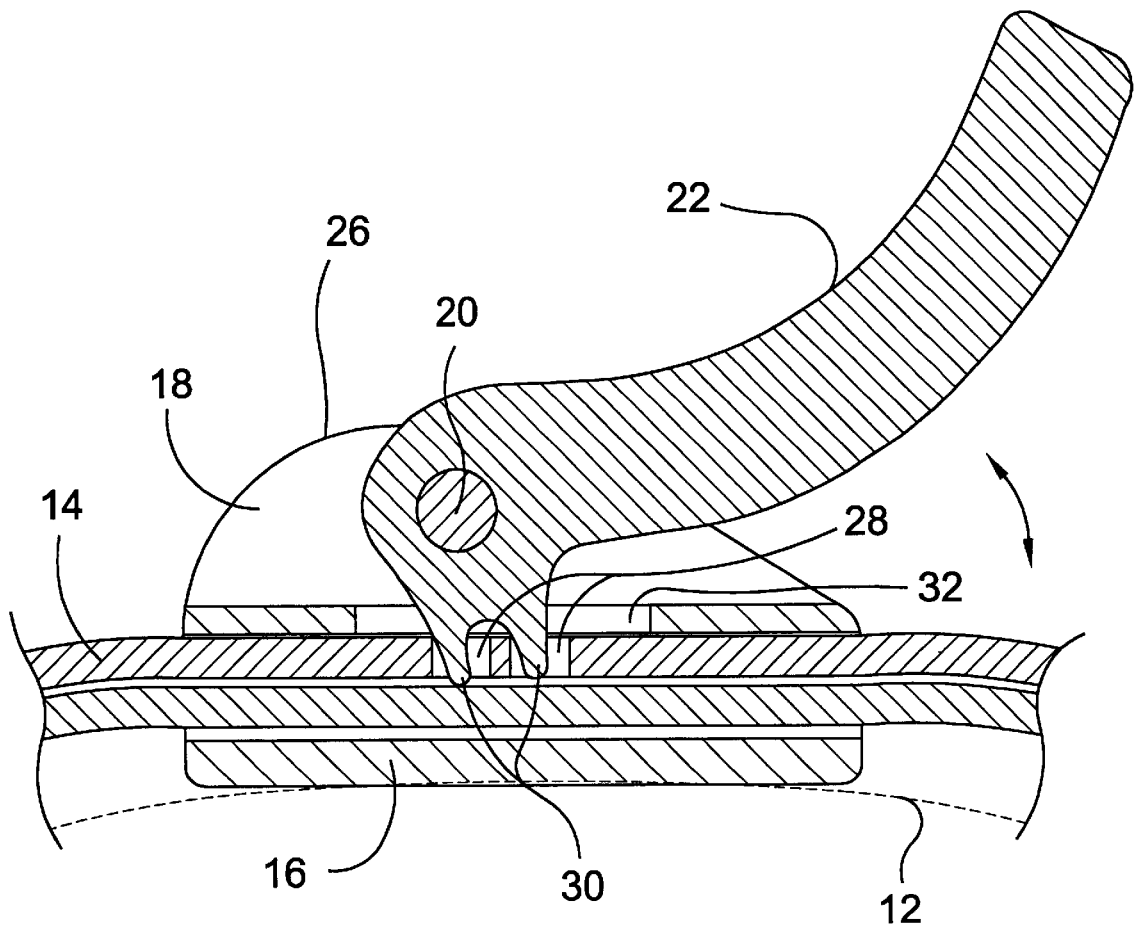
FIG. 6 is a side sectional view of the latching mechanism of the present invention.

Concluding with FIG. 6, a new and improved latching mechanism 26 of the present invention for securing materials enclosed by pipes is illustrated and will be described. More particularly, the latching mechanism 26 is shown in its closed position with cams 30 engage with slots 28 in band 14. Locking lever 22 has been rotated in a clockwise direction about pin 20 so that cams 30 pass-through cam slot 32. Pin support 18 atop band enclosure 16 holds pin 20 in place. The bottom of band enclosure 16 is frictionally engaged with cap 12.

In use, it can now be understood that in order to secure the end of a pipe 24, cap 12 is placed over the end of the pipe 24. At that point, the user tightens band 14 to frictionally engage cap 12 with pipe 24 by rotating locking lever 22 in a clockwise direction about pin 20 to close latching mechanism 26 by engaging cams 30 with slots 28. To remove cap 12, locking lever 22 is rotated in a counterclockwise direction about pin 20 to disengage cams 30 from slots 28. At this point, band 14 is loosened, and cap 12 can be removed from the end of pipe 24.

While a current embodiment of the quick release pipe end cap has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy and elastomeric material may be used instead of the neoprene rubber cap described. Also, the stainless steel latching mechanism and band may also be made of heavy-duty plastic, steel, aluminum, titanium, or similar material. And although securing materials enclosed by pipes has been described, it should be appreciated that the quick release pipe end cap herein described is also suitable for temporarily enclosing the end of a pipe to prevent the accumulation of water, snow, dirt, and other debris. Furthermore, a wide variety of pipe sizes may be accommodated by varying the dimensions of the cap, band, and latching mechanism.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A quick release pipe end cap comprising:
   a hollow cylindrical cap having a sidewall and a closed end;
   a latching mechanism frictionally engaged with said sidewall of said cap; and
   a band having opposing ends and a top surface with both ends inserted through said latching mechanism in an overlapping fashion.

2. The cap of claim 1, wherein said latching mechanism comprises:
   a hollow band enclosure having a top surface;
   pin supports attached to said top surface of said band enclosure;
   a pin mounted on said pin supports;
   a locking lever having opposing ends with one end pivotally mounted on said pin; and
   cams attached to said end of said locking lever.

3. The cap of claim 1, wherein said top surface of said band defines slots therein.

4. The cap of claim 1, wherein said band enclosure further defines a hole therein to comprise a cam slot.

5. The cap of claim 2, wherein said pin supports are selected from the group consisting of plastic, aluminum, titanium, or steel.

6. A quick release pipe end cap comprising:
   a cap having a closed end, an open end and a sidewall; and
   a quick release mechanism secured to said sidewall of said cap; said quick release mechanism comprising:
      a band having a top surface, wherein said top surface of said band defines slots therein;
      a latching mechanism connected to said band, said latching mechanism comprising:
         a hollow band enclosure having a top surface;
         pin supports attached to said top surface of said band enclosure;
         a pin mounted on said pin supports; and
         a locking lever having opposing ends with one end mounted on said pin,
            said locking lever comprising cams attached to said end of said locking lever so that said cams can engage with said slots when said band is inserted into said band enclosure and said locking lever is rotated in a clockwise fashion until contact is made between said locking lever and said band enclosure.

7. A quick release pipe end cap comprising:
   a cap of elastomeric material having a closed end, an open end, and a sidewall;
   a band having a top surface and opposing ends encircling said sidewall of said cap;
   slots, wherein said top surface of said band comprises holes therein to comprise said slots; and
   a latching mechanism enclosing said band;
   wherein said band is positioned so that said opposing ends of said band overlap inside of the interior of said band enclosure with said slots on top.

* * * * *